(12) United States Patent
Sankhavaram et al.

(10) Patent No.: US 10,949,785 B2
(45) Date of Patent: Mar. 16, 2021

(54) PRODUCT PORTFOLIO RATIONALIZATION

(71) Applicant: MICRO FOCUS LLC, Santa Clara, CA (US)

(72) Inventors: Vasu Sasikanth Sankhavaram, Sunnyvale, CA (US); Lars Rossen, Alleroed (DK)

(73) Assignee: Micro Focus LLC, Santa Clara, CA (US)

( * ) Notice: Subject to any disclaimer, the term of this patent is extended or adjusted under 35 U.S.C. 154(b) by 398 days.

(21) Appl. No.: 15/543,609

(22) PCT Filed: Jan. 28, 2015

(86) PCT No.: PCT/US2015/013250
§ 371 (c)(1),
(2) Date: Jul. 14, 2017

(87) PCT Pub. No.: WO2016/122481
PCT Pub. Date: Aug. 4, 2016

(65) Prior Publication Data
US 2018/0032935 A1 Feb. 1, 2018

(51) Int. Cl.
G06F 9/44 (2018.01)
G06Q 10/06 (2012.01)
G06Q 50/04 (2012.01)

(52) U.S. Cl.
CPC ....... G06Q 10/06315 (2013.01); G06Q 10/06 (2013.01); G06Q 10/067 (2013.01); G06Q 50/04 (2013.01); Y02P 90/30 (2015.11)

(58) Field of Classification Search
CPC .................................................. G06F 8/00–20
USPC ........................................................ 717/104
See application file for complete search history.

(56) References Cited

U.S. PATENT DOCUMENTS

| | | | |
|---|---|---|---|
| 5,845,119 A * | 12/1998 | Kozuka .................... | G06F 8/36 717/107 |
| 7,543,269 B2 * | 6/2009 | Krueger .................... | G06F 8/61 717/102 |
| 7,574,694 B2 | 8/2009 | Mangan et al. | |
| 7,627,855 B2 * | 12/2009 | Inoue ........................ | G06F 8/36 717/120 |

(Continued)

FOREIGN PATENT DOCUMENTS

WO   WO-2009117275   9/2009

OTHER PUBLICATIONS

Felix Bachmann et al.; "Variability in Software Product Lines"; Product Line Practice Initiative—Carnegie Mellon Software Engineering Institute, Pittsburgh, PA—Sep. 2005.*

(Continued)

*Primary Examiner* — Francisco J Aponte (57) ABSTRACT

A representation of functions and features associated with respective functions is received, the representation being according to a model. Features of a plurality of the products are compared to the features of the functions. Based on the comparing, a check is made for an existence of a gap of at least one of the plurality of products relating to omission of a feature, an existence of an overlap of features between multiple products of the plurality of products, and an existence of a divergence in timings of release between dependent products of the plurality of products.

20 Claims, 4 Drawing Sheets

(56) References Cited

U.S. PATENT DOCUMENTS

| | | | | |
|---|---|---|---|---|
| 7,721,252 | B2* | 5/2010 | Choi | G06F 8/10 717/100 |
| 7,778,720 | B2* | 8/2010 | Alse | G06Q 30/0201 700/103 |
| 8,050,957 | B2* | 11/2011 | Woehler | G06Q 10/06315 705/7.25 |
| 8,214,240 | B1* | 7/2012 | Morris | G06Q 10/06 705/7.11 |
| 8,370,803 | B1* | 2/2013 | Holler | G06F 8/36 717/101 |
| 8,374,713 | B2* | 2/2013 | Srinivasan | G06Q 10/067 700/106 |
| 8,448,133 | B2* | 5/2013 | Malkin | G06F 8/70 717/107 |
| 8,495,569 | B2* | 7/2013 | Yoshimura | G06F 8/70 717/120 |
| 8,549,473 | B2* | 10/2013 | Dotan | G06F 8/71 717/106 |
| 8,584,080 | B2* | 11/2013 | Gery | G06F 8/35 703/22 |
| 8,688,502 | B2* | 4/2014 | Hartley | G06Q 30/0204 705/7.29 |
| 8,739,047 | B1* | 5/2014 | Holler | G06F 3/04842 715/759 |
| 9,535,936 | B2* | 1/2017 | Romatka | G06F 16/217 |
| 9,818,142 | B2* | 11/2017 | Wang | G06Q 30/0625 |
| 9,875,095 | B2* | 1/2018 | Hanusiak | G06F 8/70 |
| 9,928,239 | B2* | 3/2018 | Hickey | G06K 9/00483 |
| 10,542,121 | B2* | 1/2020 | Liu | G06F 9/44505 |
| 2005/0038542 | A1* | 2/2005 | Kern | G06F 30/00 700/105 |
| 2005/0166178 | A1* | 7/2005 | Masticola | G06F 8/20 717/104 |
| 2005/0216879 | A1* | 9/2005 | Ruhe | G06Q 10/10 717/101 |
| 2006/0047550 | A1 | 3/2006 | Dineen et al. | |
| 2006/0129418 | A1 | 6/2006 | Lee et al. | |
| 2006/0235779 | A1 | 10/2006 | Drew et al. | |
| 2007/0174107 | A1* | 7/2007 | Aravamudan | G06Q 10/06 705/300 |
| 2008/0215400 | A1 | 9/2008 | Ban et al. | |
| 2008/0250389 | A1* | 10/2008 | Hinchey | G06F 8/20 717/107 |
| 2008/0255925 | A1* | 10/2008 | Vailaya | G06Q 30/0204 705/7.33 |
| 2009/0089753 | A1* | 4/2009 | Yoshimura | G06F 8/75 717/121 |
| 2010/0106280 | A1* | 4/2010 | Hansen | G06Q 10/06 700/107 |
| 2012/0066147 | A1* | 3/2012 | Adhikary | G06Q 10/067 705/348 |
| 2012/0078681 | A1* | 3/2012 | Rahman | G06Q 30/0201 705/7.29 |
| 2012/0102451 | A1* | 4/2012 | Kulkarni | G06F 8/24 717/102 |
| 2012/0240100 | A1* | 9/2012 | Kang | G06F 8/54 717/106 |
| 2012/0317119 | A1* | 12/2012 | Fukuda | G06Q 10/06 707/737 |
| 2013/0018700 | A1 | 1/2013 | Ervolina et al. | |
| 2013/0090962 | A1* | 4/2013 | Dotan | G06Q 10/06313 705/7.12 |
| 2013/0325656 | A1 | 12/2013 | Ouimet | |
| 2014/0032256 | A1* | 1/2014 | Hess | G06Q 10/06 705/7.24 |
| 2014/0180881 | A1* | 6/2014 | Krueger | G06Q 10/06 705/28 |
| 2014/0324918 | A1 | 10/2014 | Boulila | |
| 2015/0066672 | A1* | 3/2015 | Swamynathan | G06Q 30/0603 705/26.1 |
| 2015/0317128 | A1* | 11/2015 | Baughman | G06F 8/20 717/103 |
| 2016/0132806 | A1* | 5/2016 | To | G06Q 10/06313 705/7.23 |
| 2016/0189278 | A1* | 6/2016 | Parpia | G06Q 30/0635 705/26.81 |
| 2019/0129408 | A1* | 5/2019 | Cella | H04W 4/70 |

OTHER PUBLICATIONS

"Gap Analysis," TOGAF 9.1>Part III: ADM Guidelines & Techniques available at http://pubs.opengroup.org/architecture/togaf9-doc/arch/chap27.html downloaded Dec. 3, 2014 (3 pages).

"The Minto Pyramid Principle: A powerful and compelling process for producing everyday business documents . . . ", online course by Minto Books International, Inc., London,UK available at http://www.barbaraminto.com/ downloaded Dec. 3, 2014 (1 page).

Cognizant, Consumer Goods Supply Chain Landscape: Is Best-of-breed a Dying Breed? Sep. 2011 (7 pages).

Wikipedia, "MECE Principle," available at http://en.wikipedia.org/wiki/MECE_principle last modified Nov. 13, 2014 (2 pages).

"Application Portfolio Rationalization: How IT Standardization Fuels Growth," An Oracle White Paper in Enterprise Architecture, May 2010 (19 pages).

International Searching Authority, ISRWROP; PCT/US2015/013250; dated Oct. 28, 2015, 9 pgs.

* cited by examiner

PRODUCT PORTFOLIO RATIONALIZATION

BACKGROUND

An enterprise can have a portfolio of products used to perform various tasks of the enterprise. Products can include applications, devices, or machines. In some cases, an enterprise can have hundreds or even thousands of products, some built by the enterprise and some provided by vendors.

BRIEF DESCRIPTION OF THE DRAWINGS

Some implementations according to the present disclosure are described with respect to the following figures.

DETAILED DESCRIPTION

Products used by an enterprise (such as a business concern, an educational organization, a government agency, an individual, etc.) can include applications (machine-executable instructions), devices (e.g. computers, smartphones, printers, storage devices, communication nodes, etc.), machines (e.g. manufacturing equipment, vehicles, etc.), services (e.g. web services or other services provided by machine-executable instructions), and so forth. Products can be developed in-house by the enterprise, and/or can be provided by one or multiple outside vendors of the enterprise.

Over time, a large number of products may be accumulated by the enterprise. Products can be developed by different groups (within the enterprise or an outside vendor), with little interaction or coordination between the groups. As a result, products may have redundant or duplicate functionality, and/or there may be gaps in functionality. In some cases, merger and acquisition activities of an enterprise can also result in products with redundant functionality.

Also, some products may be dependent upon other products (e.g. a first product invokes or employs a second product to perform specified tasks). If the release timelines of such dependent products are far apart, then divergence may occur, in which a first product may be released early, but a second product on which the first product depends may not be released until later. Divergence can also occur when a new version of a product drops a feature that was supported by an earlier version.

Product portfolio analysis can be performed to rationalize the products in a portfolio. Rationalizing products of the portfolio can refer to taking actions to address product overlap, product gap, and product divergence. A product gap (or more simply "gap") can refer to a product lacking an expected or specified feature (or features). Product overlap (or more simply "overlap") can refer to at least two products providing at least one identical feature, such that feature duplication exists. Product divergence (or more simply "divergence") can refer to a difference in timings of release of multiple products that depend on one another, where the difference in timings of release is greater than some specified time threshold. Alternatively, product divergence can also occur if a new version of a product drops a feature present in a previous version of the product. Product divergence can also occur when underlying technologies used in different products diverge. For example, different products can use components from different vendors.

Manually performing the rationalization of a product portfolio is time-consuming, labor-intensive, and may not produce accurate results. In accordance with some implementations according to the present disclosure, structured product portfolio rationalization is provided to identify gaps, overlaps, and divergences in products of a product portfolio. The structured product portfolio rationalization uses a defined model and a defined process to perform the rationalization.

The model can be a canonical data model (CDM). A CDM defines entities within an enterprise, and relationships among the entities. The CDM provides a common representation of entities of the same entities so that different organizations can refer to the entities using a common representation of the entities and their relationships. Details of an example CDM according to some implementations are discussed further below in connection with FIG. 2.

Figure 1:
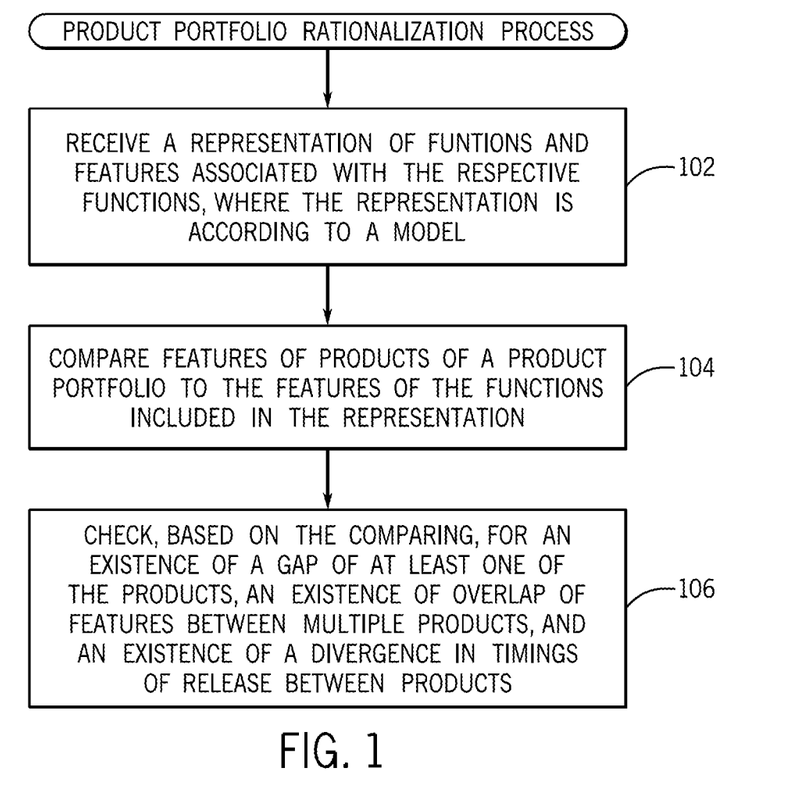
FIG. 1 is a flow diagram of an example product portfolio rationalization process according to some implementations.

FIG. 1 is a flow diagram of a product portfolio rationalization process according to some implementations. The rationalization process receives (at 102) a representation of functions and features associated with the respective functions, where the representation is according to a model, such as the CDM. A function can refer to a service, a collection of actions, and so forth, that is provided to address an issue (e.g. a customer problem, a defect, a goal, etc.).

In some examples, functions can include information technology (IT) functions, such as functions for management of development and production of program code, management of products, support management, and so forth. In some examples, IT functions can be defined by a vendor-neutral Reference Architecture provided by the IT4IT™ Forum. The IT4IT™ Reference Architecture provides guidance relating to IT products that are used for IT management.

In other examples, functions can be defined by a software taxonomy provided by the International Data Corporation (IDC), where the software taxonomy includes functions relating to software development. In further examples, the functions can be obtained from other sources, and in some cases, functions can be proprietary to the enterprise.

A function can have one or multiple features. For example, a function can be a document editing function (for creating and editing a document). The document editing function can have a set of features, such as: create a document, insert text into a document, add comments to a document, highlight text in a document, change font in a document, and so forth.

Another example function can be a fault-resolution function to address a fault in a device. The features of the fault-resolution function can include detecting the fault, identifying an action to take to address the fault, and implementing the action to address the fault.

The representation of the functions can include a list of functions with associated features, or a table of functions with associated features, or some other data structure that contains information relating to the functions and features associated with each of the functions.

The rationalization process of FIG. 1 compares (at 104) features of products of a product portfolio to the features of the functions included in the representation received (at 102). Products can be used to implement functions, where each product can implement one or multiple respective functions. For example, to implement a document editing function, any of the following products may be used: a rich text editor, the WordPad product from Microsoft, the Notepad product from Microsoft, or Microsoft Word. Each product has a set of features, which may or may not match the set of features associated with the corresponding function. For example, the Notepad product may not have all of the features associated with the document editing function. On the other hand, the rich text editor may have all of the features of the document editing function.

Based on the comparing (at 104), the rationalization process checks (at 106) for the following: an existence of a gap of a product (where the gap relates to omission of at least one feature in the product), an existence of an overlap of features between multiple products in the product portfolio (where the overlap of features indicates that multiple products are providing redundant features, which may not be efficient), and an existence of the divergence in timing of releases between dependent products of the product portfolio. The rationalization process can also check for divergence caused by a later version of a given product dropping a feature present in an earlier version of the given product.

Certain features of a function or a product can be part of a hierarchy of features. A hierarchy of features can include a higher level feature that contains lower level features. For example, a higher level feature of a document editing function can include rich text formatting. Lower level features of the rich text formatting feature can include changing font, underlining, bolding, and so forth.

The comparing of features of the products of the product portfolio to features of the functions can include a comparing of a hierarchy of features of a product to a hierarchy of features of a function. The ability to compare hierarchies of features of functions and products allows for the rationalization process to drill down further into the features of the respective products and functions to determine whether gaps, overlaps, and divergences are present at lower levels in the hierarchies.

Based on the determination of an existence of a gap of a product, an existence of overlap between multiple products, and/or an existence of divergence in timings of release between dependent products, the rationalization process can provide an output indicating an action (or actions) to take. The indicated action(s) can include modifying a given product, which can involve modifying a current product that is under development, or modifying a future product for which product development has not yet started. Modifying a given product can also include changing, adding, or removing a feature of the given product, or modifying a timing of release of the given product.

Figure 2:
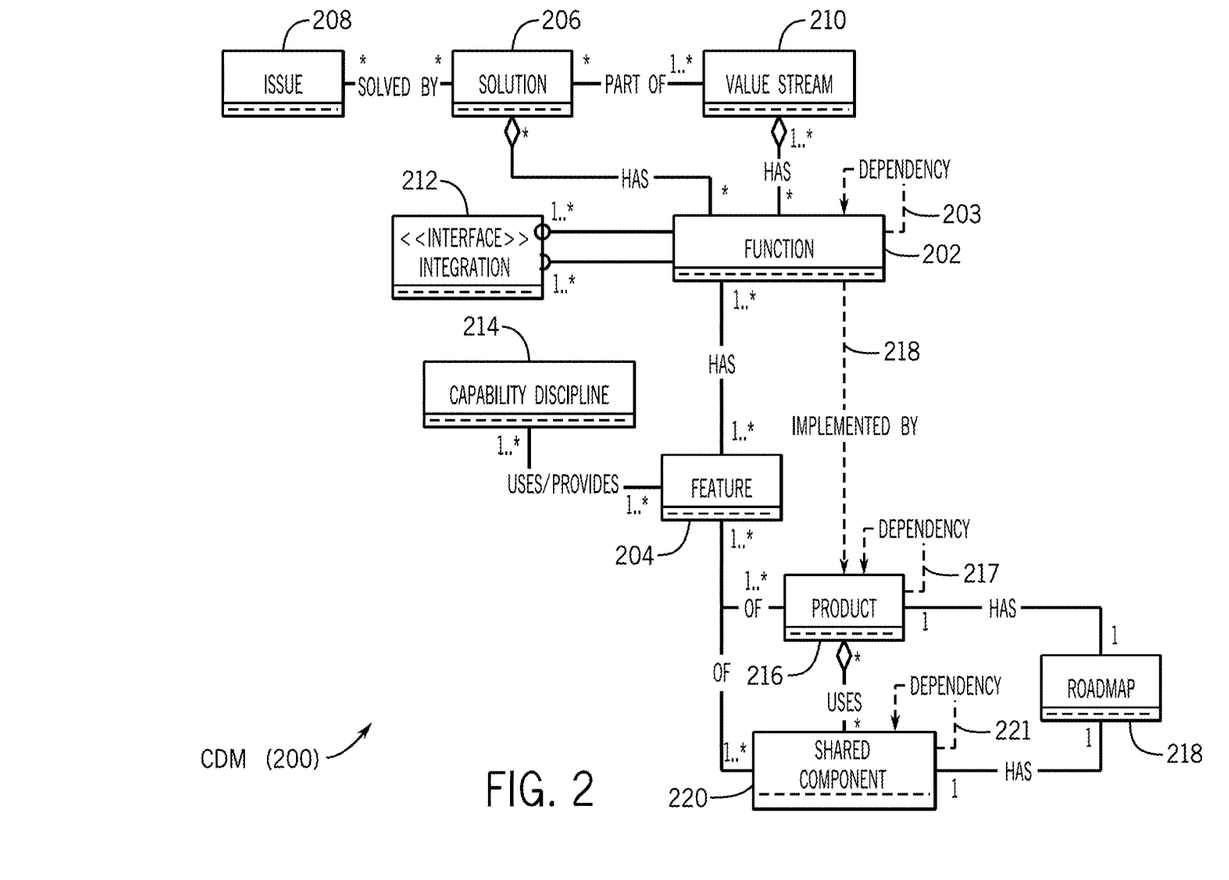
FIG. 2 is a schematic diagram of an example canonical data model according to some implementations.

FIG. 2 is a schematic diagram of an example CDM 200 according to some implementations. Each node in the CDM 200 represents a respective entity, and a line connecting two nodes represents a relationship between the entities represented by the corresponding nodes interconnected by the line. The relationship types and cardinalities (e.g. "1 . . . *") noted in FIG. 2 are according to Unified Modeling Language (UML) notations. Although specific entities are represented by the CDM 200 according to some examples, it is noted that in other examples, other or alternative entities can be represented by a CDM.

In the CDM 200, a function node 202 represents a function, which is interconnected to various other nodes. The function node 202 has a dependency arrow 203 that points back to the function node 202, which indicates that a first function can depend on a second function.

The function node 202 is interconnected to a feature node 204, which represents a feature of the function. The relationship between the function node 202 and the feature node 204 specifies that a function has a feature. Note that a function represented by the function node 202 can have multiple features.

The function node 202 is also interconnected to a solution node 206, which represents a solution to an issue represented by an issue node 208. The solution represented by the solution node 206 has the function represented by the function node 202. An issue represented by the issue node 208 can represent any of various issues, such as a customer problem, a defect or fault, a goal, and so forth.

The solution represented by the solution node 206 is part of a value stream represented by a value stream node 210 that is interconnected to the function node 202. A value stream can include a logical group of functions. As represented in FIG. 2, the value stream represented by the value stream node 210 has the function represented by the function node 202.

The function 202 is interconnected to a node 212, which represents a set of one or more interfaces and a set of one or more integrations. The set of one or multiple interfaces can refer to the interface(s) that is specified by the function represented by the function node 202 for communication with other functions. The one or multiple integrations represented by the node 212 can represent how the function represented by the function node 202 is integrated with another function, using the interface(s) represented by the node 212. As an example, integration can include an application programming interface (API)-based integration, to allow for sharing of data between different products through an API.

The feature node 204 is interconnected to a capability discipline node 214, which represents a capability discipline. A capability discipline is a function delivered through a combination of people, process, and technology.

A relationship also exists between the function represented by the function node 202 and a product represented by a product node 216. The relationship (represented by arrow 218) can be an explicit relationship or an implicit relationship. The CDM 200 specifies that the function represented by the function node 202 can be implemented by the product represented by the product node 216.

The product node 216 has a dependency arrow 217 to indicate that a first product can depend on a second product (in other words, the first product uses or invokes the second product to perform specified task(s)). The product node 216 is interconnected to the feature node 204, to indicate that a product has a feature(s).

The product represented by the product node 216 also has a roadmap represented by a roadmap node 218. A roadmap can refer to a plan that specifies goals and solutions (as implemented by products) to those goals. The roadmap can also specify timings associated with release of products. A roadmap can be described in a document.

A relationship between the product represented by the product node 216 and a shared component represented by a shared component node 220 indicates that the product can have one or multiple shared components (shared with at least another product). As examples, a shared component can include a code routine (implemented as machine-executable instructions), a physical component of a device or machine, or any other part of a product. The roadmap represented by the roadmap node 218 can also include information pertaining to the shared component.

The shared component node 220 has a dependency arrow 221 to indicate that a first shared component can depend on a second shared component.

Figure 3:
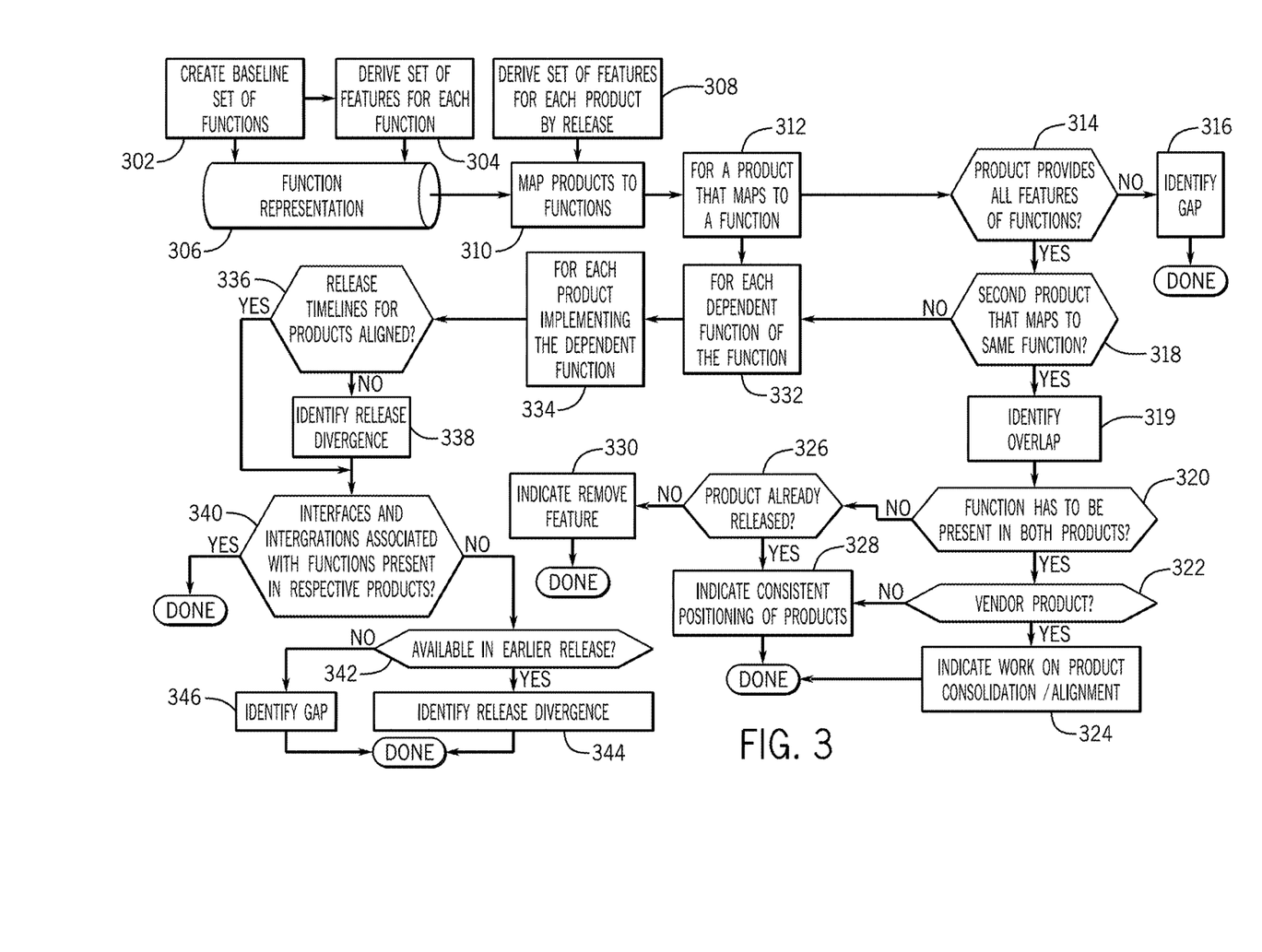
FIG. 3 is a flow diagram of another example product portfolio rationalization process according to some implementations

FIG. 3 is a flow diagram of a rationalization process according to further implementations. The rationalization process of FIG. 3 creates (at 302) a baseline set of functions and any dependencies between functions. In addition, the rationalization process derives (at 304) features for each function. The creation of the set of functions and the features of those functions can be based on input from expert(s) within the enterprise, or from other source(s).

Based on the set of functions and the derived features, the rationalization process produces a representation (306) of the functions and the associated features. The information in the representation (306) can be according to the CDM 200 of FIG. 2. The information for each function can indicate the dependency of one function with respect to another function.

For each product of a portfolio of products, the rationalization process derives (at 308) a set of features by release. Note that a product can have multiple releases (multiple versions), with each release having a different set of features. The features of products can be derived from various documents, including a roadmap, product specifications, product data sheets, and so forth. The deriving of the features of the products can be performed periodically, intermittently, or in response to some specified event, such as when a new product is being planned or when a release of a product occurs.

The rationalization process maps (at 310) products to functions using the features of the functions and the products. Mapping a product to a function involves comparing the features of the product with features of the function. A given product is considered to map to a given function if the features of the product match the features of the function according to some similarity criterion. For example, if there is an overlap of the set of features of the product and the set of features of the function by greater than some specified threshold (e.g. greater than 75% or some other specified percentage of the features match), then the product is considered to map to the function.

Note that the matching of product features with function features can also be based on a weighted matching, where weights can be assigned to respective features of the products and functions. Certain features can be considered more important than other features, so that such more important features are assigned higher weights than weights assigned to less important features. The weighted matching of product features and function features can thus be based on some aggregate (e.g. sum, average, etc.) that is based on the weights. A score can be produced from the aggregating, where a score above some specified threshold is an indication of a match, such that the product is considered to map to the function.

For a given product that maps to a respective function (as determined at 312), the rationalization process of FIG. 3 determines (at 314) whether the given product provides all of the features of the respective function. If not, a gap is identified (at 316), where the gap corresponds to the fact that at least one feature of the respective function is not included in the given product. The rationalization process can generate an output indicating that the gap is to be addressed in a future release of the given product or in another product.

If the given product provides all of the features of the respective function (as determined at 314) or if a gap has been identified (at 316), the rationalization process determines (at 318) if there is a second product that maps to the same respective function as the given product. Note that "second product" can refer to one or multiple products. If there is a second product that maps to the same respective function as the given product, the rationalization process identifies (at 319) the existence of an overlap (duplication) of features.

The rationalization process next determines (at 320) if the respective function has to be present in both products. If so, the rationalization process determines (at 322) if the given product or second product is a vendor product (a product provided by an outside vendor). If the given product or second product is a vendor product, an output is generated (at 324) indicating that work on product consolidation and/or alignment with the vendor is to be performed. The product consolidation and/or alignment involves identifying duplicate features and working with the vendor to remove the duplicate features.

However, if neither the given product nor the second product is a vendor product (as determined at 322), then the rationalization process generates (at 328) an output indicating that consistent positioning of the products is to be implemented, to determine the circumstances under which each of the products having the duplicate features are to be used. The output 328 can also indicate that a plan should be developed to remove overlapping features in the future.

If the rationalization process determines (at 320) that the respective function does not have to be employed in both products, then the rationalization process determines (at 326) if the given product or the second product has already been released. If so, then task 328 is performed. However, if either the given product or the second product has not yet been released, then the rationalization process generates (at 330) an output indicating that the overlapping feature(s) is to be removed from the product that has not yet been released.

As further shown in FIG. 3, the rationalization process also identifies a divergence when timelines of products implementing dependent functions diverge. For a first product that maps to a first function (as determined at 312), and for each dependent function of the first function (as determined at 332), and for each second product implementing the dependent function (as determined at 334), the rationalization process determines (at 336) whether the release timelines for the dependent products (first and second products) implementing the respective first function and the dependent function are aligned. The release timelines for the dependent products are not aligned if the timings of the release of the dependent products differ by greater than a specified time threshold. If the dependent products are not aligned, the rationalization process identifies (at 338) divergence, and generates an output indicating that work towards consistent release of the dependent products should be implemented.

The rationalization process further determines (at 340) if the interfaces and integrations (as represented by the node 212 in FIG. 2) associated with respective functions are present in respective products that implement the functions. If not, then the rationalization process determines (at 342) whether specified interface(s) and product integration(s) associated with a function is available in an earlier release of a particular product.

If the specified interface(s) and product integration(s) associated with a function is available in an earlier release of a particular product, the rationalization process identifies (at 344) an integration divergence, and generates an output indicating that work on retaining integration should be implemented.

However, if there is no earlier release that includes the specified interface(s) and integration(s), then the rationalization process identifies (at 346) an integration gap, and generates an output indicating that the integration gap is to be addressed in a future release of a product, by providing the specified interface(s) and integration(s) in the future release.

In some implementations, the rationalization process can also analyze a value stream (represented by the value stream node 210 of FIG. 2) to determine if any of the functions of the value stream is not supported by any product; in other words, no product maps to a given function. The given function can be identified as a candidate for future investment and incorporation into a product.

Figure 4:
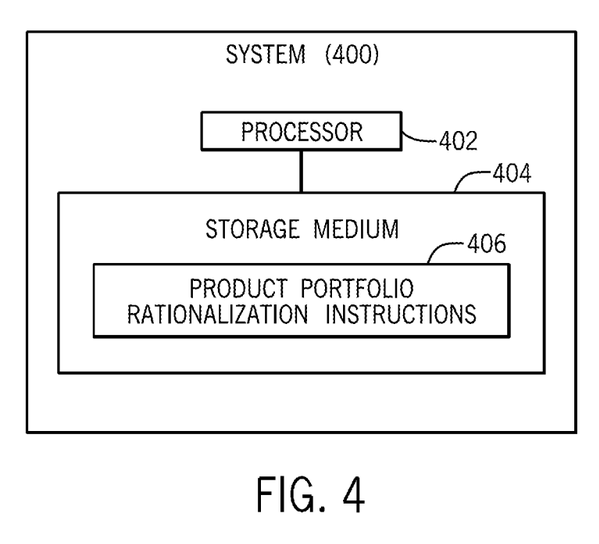
FIG. 4 is a block diagram of an example system according to some implementations.

FIG. 4 is a block diagram of a system 400 according to some implementations. The system 400 can include a computer or an arrangement of multiple computers.

The system 400 includes a processor (or multiple processors) 402, which is coupled to a non-transitory machine-readable or computer-readable storage medium (or storage media) 404. A processor can include a microprocessor, a microcontroller, a programmable integrated circuit, a programmable gate array, or another processing hardware. The storage medium (or storage media) 404 can store product portfolio rationalization instructions 406, which are machine-executable instructions that upon execution by the processor(s) 402 cause performance of the process of FIG. 1 or 3, for example.

The storage medium (or storage media) 404 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving, in a system comprising a hardware processor, a representation of a plurality of functions and features associated with respective functions of the plurality of functions, the representation of the plurality of functions and features being according to a model;
   comparing, by the system, features of a plurality of products for implementing corresponding functions, to the features associated with the respective functions in the representation of the plurality of functions and features;
   identifying, by rationalization instructions executed in the system, dependent products in the plurality of products, wherein the dependent products comprise a first product that depends on a second product; and
   based on the comparing of features:
      identifying, by the system, an existence of a gap of at least one of the plurality of products relating to an omission of a feature,
      identifying, by the system, an existence of an overlap of features between multiple products of the plurality of products, and
      identifying, by the system, an existence of a divergence in timings of release between the dependent products as identified by the rationalization instructions, the divergence in the timings of the release between the dependent products being identified by the system when a time of release of the first product of the dependent products differs from a time of release of the second product of the dependent products by greater than a time threshold.

2. The method of claim 1, further comprising identifying, by the system based on the comparing, a divergence due to a later version of a given product dropping a feature present in an earlier version of the given product.

3. The method of claim 1, further comprising:
   modifying a given product in response to the identifying of the existence of the divergence in the timings of the release between the dependent products,
   wherein the modifying of the given product comprises modifying a timing of release of the given product, or changing, adding, or removing a feature of the given product.

4. The method of claim 1, wherein a first function of the plurality of functions is associated with first plural features, and a given product of the plurality of products is associated with second plural features, and wherein the comparing comprises comparing the first plural features of the first function with the second plural features of the given product.

5. The method of claim 1, wherein the identifying of the existence of the gap comprises:
   mapping a first function of the plurality of functions to a given product of the plurality of products;
   determining whether the given product provides all features of the first function; and
   identifying the existence of the gap in response to determining that the given product does not provide all features of the first function.

6. The method of claim 1, wherein the identifying of the existence of the overlap of features between multiple products of the plurality of products comprises:
   mapping a first function of the plurality of functions to a third product of the plurality of products;
   determining whether a fourth product also maps to the first function; and
   in response to determining that the fourth product also maps to the first function, identifying an overlap between the third and fourth products.

7. The method of claim 1, wherein the identifying of the existence of the divergence in timings comprises:
   mapping a first function of the plurality of functions to the first product;
   identifying a second function that depends on the first function;

identifying the second product mapped to the second function;
determining whether release timelines of the first and second products are aligned; and
in response to determining misalignment of the release timelines of the first and second products, identifying a divergence in timings of release between the first and second products.

8. The method of claim 1, further comprising:
mapping a first function of the plurality of functions to a given product of the plurality of products;
determining whether an interface associated with the first function mapped to the given product is present in the given product; and
in response to determining that the interface associated with the first function mapped to the given product is not present in the given product, identifying a gap or divergence associated with the given product.

9. The method of claim 1, wherein the features of the plurality of products comprise a first hierarchy of features, and the features associated with the respective functions in the representation of the plurality of functions and features comprise a second hierarchy of features, and wherein the comparing comprises comparing the first hierarchy of features and the second hierarchy of features.

10. The method of claim 9, wherein in the first hierarchy of features, a first feature includes multiple other features, and in the second hierarchy of features, a second feature includes multiple other features.

11. The method of claim 7, wherein the model comprises:
a function node,
a feature node interconnected to the function node,
a solution node interconnected to the function node,
an issue node, and
a value stream node interconnected to the function node,
wherein the function node represents a given function, the feature node represents a given feature of the given function, the solution node represents a solution to an issue represented by the issue node, and the value stream node represents a value stream comprising a logical group of functions including the given function.

12. A system comprising:
at least one storage medium to store a representation of functions according to a model that indicates relationships between a function and features of the functions; and
at least one processor to:
derive, from documents relating to a plurality of products, features of the plurality of products that are to implement corresponding functions;
map the features of the plurality of products to features associated with functions of the representation of functions;
identify, by rationalization instructions executed by the at least one processor, dependent products in the plurality of products, wherein the dependent products comprise a first product that depends on a second product; and
based on the mapping of features:
identify an existence of a gap of at least one of the plurality of products relating to an omission of a feature,
identify an existence of an overlap of features between multiple products of the plurality of products, and
identify an existence of a divergence in timings of release between the dependent products, the divergence in the timings of the release between the dependent products being identified when a time of release of the first product of the dependent products differs from a time of release of the second product of the dependent products by greater than a time threshold.

13. The system of claim 12, wherein the features of the plurality of products and the features associated with the functions of the representation of functions comprise a hierarchy of features including a higher level feature and lower level features contained in the higher level feature, wherein the mapping comprises mapping a hierarchy of features of a first product of the plurality of products to a hierarchy of features associated with a first function of the functions of the representation of functions.

14. The system of claim 12, wherein the at least one processor is to further provide an output indicating a modification of a given product, the modification being in response to the identifying of the existence of the divergence in timings.

15. The system of claim 12, wherein the at least one processor is to:
identify, based on the mapping, a given function of the functions of the representation of functions that none of the plurality of products map to; and
provide an output indicating development of a future product to implement the given function.

16. The system of claim 12, wherein the at least one processor is to:
map a first function of the functions of the representation of functions to a given product of the plurality of products;
determine whether the given product provides all features of the first function; and
identify the existence of the gap in response to determining that the given product does not provide all features of the first function.

17. The system of claim 12, wherein the at least one processor is to:
map a first function of the functions of the representation of functions to a third product of the plurality of products;
determine whether a fourth product also maps to the first function; and
in response to determining that the fourth product also maps to the first function, identify an overlap between the third and fourth products.

18. The system of claim 12, wherein the at least one processor is to:
map a first function of the functions of the representation of functions to the first product;
identify a second function that depends on the first function;
identify the second product mapped to the second function;
determine whether release timelines of the first and second products are aligned; and
in response to determining misalignment of the release timelines of the first and second products, identify a divergence in timings of release between the first and second products.

19. An article comprising at least one non-transitory machine-readable storage medium storing instructions for product portfolio rationalization, the instructions upon execution causing a system to:
receive a representation of a plurality of functions and features associated with respective functions of the plurality of functions, wherein features associated with a first function of the plurality of functions comprise a hierarchy of features;

compare features of a plurality of products to the features associated with the respective functions in the representation of the plurality of functions and features, the comparing comprising comparing a hierarchy of features of a first product of the plurality of products to the hierarchy of features associated with the first function, wherein the plurality of products are to implement corresponding functions;

identify dependent products in the plurality of products, wherein the dependent products comprise a first product that employs or invokes a second product; and based on the comparing of features:
- identify an existence of a gap of at least one of the plurality of products relating to an omission of a feature,
- identify an existence of an overlap of features between multiple products of the plurality of products, and
- identify an existence of a divergence in timings of release between the dependent products, the divergence in the timings of the release between the dependent products being identified when a time of release of the first product of the dependent products differs from a time of release of the second product of the dependent products by greater than a time threshold.

20. The article of claim 19, wherein the representation of the plurality of functions and features is according to a model comprising:
- a function node,
- a feature node interconnected to the function node,
- a solution node interconnected to the function node,
- an issue node, and
- a value stream node interconnected to the function node,
- wherein the function node represents a given function, the feature node represents a given feature of the given function, the solution node represents a solution to an issue represented by the issue node, and the value stream node represents a value stream comprising a logical group of functions including the given function.

* * * * *